US012624575B2

(12) United States Patent
Kondi et al.

(10) Patent No.: US 12,624,575 B2
(45) Date of Patent: May 12, 2026

(54) MULTI-POINT EXIT DEVICE

(71) Applicant: Schlage Lock Company LLC, Carmel, IN (US)

(72) Inventors: Sushanth Anand Rao Kondi, Bangalore (IN); Mohammed Maksood Ali, Bangalore (IN); Kemparaju Putaswamy, Bangalore (IN); Michael D. Coleman, Noblesville, IN (US); Matthew S. Graham, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 434 days.

(21) Appl. No.: 18/118,515

(22) Filed: Mar. 7, 2023

(65) Prior Publication Data

US 2024/0076907 A1 Mar. 7, 2024

Related U.S. Application Data

(63) Continuation of application No. 16/279,589, filed on Feb. 19, 2019, now Pat. No. 11,598,123, which is a (Continued)

(51) Int. Cl.

| | |
|---|---|
| ***E05B 53/00*** | (2006.01) |
| ***E05B 63/18*** | (2006.01) |
| ***E05B 65/10*** | (2006.01) |

(52) U.S. Cl.

CPC .......... *E05B 53/003* (2013.01); *E05B 63/185* (2013.01); *E05B 65/1006* (2013.01); *E05B 65/1046* (2013.01)

(58) Field of Classification Search

CPC ............. Y10T 292/08; Y10T 292/0801; Y10T 292/0802; Y10T 292/0803;

(Continued)

(56) References Cited

U.S. PATENT DOCUMENTS

| | | |
|---|---|---|
| 443,418 A | 12/1890 | Wallace |
| 540,911 A | 6/1895 | George |

(Continued)

OTHER PUBLICATIONS

Canadian Office Action; Canadian Intellectual Property Office; Canadian Patent Application No. 2,956,391; Dec. 28, 2017; 3 pages.

(Continued)

*Primary Examiner* — Alyson M Merlino

(74) *Attorney, Agent, or Firm* — Taft Stettinius & Hollister LLP

(57) ABSTRACT

A center slide assembly for a multi-point exit device. Upper and lower spool assemblies may be displaced from first positions to second positions along an inner region of a center slide. The displacement of the spool assemblies may displace upper and lower pull cables so as to retract latch mechanisms from extended positions to retracted positions. A first latching pin may be displaced, along with the displacement of the upper spool assembly, along an abutment surface of a tilting link so as to pivotally displace the tilting link from an unlocked position to a locked position. Displacement of the lower spool assembly may displace a second latching pin to a position wherein the second latching pin may be received and retained within a jog of the tilting link when the tilting link is in the locked position, which may thereby retain the associated latch mechanism in the retracted position.

14 Claims, 13 Drawing Sheets

Related U.S. Application Data continuation of application No. 14/791,798, filed on Jul. 6, 2015, now Pat. No. 10,208,507.

(60) Provisional application No. 62/020,785, filed on Jul. 3, 2014.

(58) Field of Classification Search

CPC ......... Y10T 292/0805; Y10T 292/0806; Y10T 292/0807; Y10T 292/0808; Y10T 292/0809; Y10T 292/081; Y10T 292/0811; Y10T 292/0813; Y10T 292/083; Y10T 292/0841; Y10T 292/0855; Y10T 292/0908; Y10T 292/0909; Y10T 292/091; Y10T 292/0931; Y10T 292/0992; Y10T 292/1017; Y10T 292/1057; E05B 53/003; E05B 53/005; E05B 63/185; E05B 63/20; E05B 65/1006; E05B 65/1045; E05B 65/10; E05B 65/1013

See application file for complete search history.

(56) References Cited

U.S. PATENT DOCUMENTS

| | | | |
|---|---|---|---|
| 912,379 | A | 2/1909 | Jackson |
| 2,238,266 | A | 4/1941 | Johnson |
| 2,319,612 | A | 5/1943 | Lichtfeldt |
| 3,345,099 | A | 10/1967 | Paul et al. |
| 3,819,213 | A | 6/1974 | Vanderburgh |
| 3,965,564 | A | 6/1976 | Slovensky, Jr. |
| 4,961,330 | A | 10/1990 | Evans |
| 5,590,917 | A | 1/1997 | Brooks et al. |
| 5,688,002 | A | 11/1997 | Riley et al. |
| 5,816,017 | A | 10/1998 | Hunt et al. |
| 5,820,173 | A | 10/1998 | Fuller |
| 5,864,936 | A | 2/1999 | Riley et al. |
| 6,000,733 | A | 12/1999 | Linder |
| 6,641,183 | B2 | 11/2003 | Brown |
| 6,679,019 | B2 | 1/2004 | Rochman |
| 6,820,905 | B1 | 11/2004 | Haeck et al. |
| 6,945,571 | B2 | 9/2005 | Lin |
| 7,152,889 | B2 | 12/2006 | Jeffries |
| 7,641,244 | B2 | 1/2010 | Lin |
| 7,748,757 | B2 | 7/2010 | Shen |
| 7,788,954 | B2 | 9/2010 | Schumm |
| 7,946,080 | B2 | 5/2011 | Ellerton et al. |
| 9,957,734 | B2 | 5/2018 | Ali et al. |
| 2004/0227351 | A1 | 11/2004 | Lin |
| 2007/0273158 | A1 | 11/2007 | Berger |
| 2012/0074714 | A1 | 3/2012 | Saccon |
| 2012/0139266 | A1 | 6/2012 | Chen et al. |
| 2013/0154283 | A1 | 6/2013 | Arlinghaus et al. |

OTHER PUBLICATIONS

International Search Report; US Patent and Trademark Office; International PCT Application No. PCT/US2015/039196; Sep. 17, 2015; 2 pages.

Written Opinion of the International Searching Authority; US Patent and Trademark Office; International PCT Application No. PCT/US2015/039196; Sep. 17, 2015; 5 pages.

MULTI-POINT EXIT DEVICE

CROSS-REFERENCE TO RELATED APPLICATIONS

The present application is a continuation of U.S. patent application Ser. No. 16/279,589 filed Feb. 19, 2019 and issued as U.S. Pat. No. 11,598,123, which is a continuation of U.S. patent application Ser. No. 14/791,798 filed Jul. 6, 2015 and issued as U.S. Pat. No. 10,208,507, which claims the benefit of U.S. Provisional Patent Application Ser. No. 62/020,785 filed Jul. 3, 2014, the contents of each application are hereby incorporated by reference in their entirety.

BACKGROUND

Multi-point exit devices often provide a relatively high degree of strength due to the multiple latching points of the exit device. During operation, when a closed door is to be displaced to an open position, a push bar of the multi-point exit device is typically depressed so that the top and bottom latch bolts are retracted away from or out of a mating recess, and into or toward the door. The latch bolts are also often maintained in retracted positions as the door is displaced from the closed position so as to prevent the latch bolts from dragging across an adjacent surface as the door is moved between open and closed positions. For example, by retaining a bottom latch bolt in a retracted position, the bottom latch bolt may not be dragged across the floor as the door is displaced from and subsequently returned to the closed position.

Traditionally, multi-point exit devices utilize hold-open mechanisms to retain both the top and bottom latches in the retracted position until the door is returned to the closed position. Such hold open-mechanisms typically utilize a direct connection between the top latch and the bottom latch to control when the bottom latch is released from the retracted position. For example, the top latch is often connected to the bottom latch by one or more rods that exert pulling forces on the top and bottom latches to retract the latch bolts from the adjacent recess when the door is to be opened. When the door is displaced from the closed position, the rods may remain in the pulled position so as to assist in holding the latches in the retracted position.

Often, when the door is returned to the closed position, a release mechanism may contact the top latch in a manner that allows a spring to push the top latch back to the extended position, wherein the top latch bolt may again be extended into a locking engagement with the adjacent recess. The release of the top latch from the retracted position also releases one or more of the rods from the pull position, which may result in a spring associated with the bottom latch providing a force to push the bottom latch back to the extended position, as well as assist with displacing one or more of the rods from the pull position.

The connection between the top latch and the bottom latch of such hold-open mechanisms often requires relatively complex linkages. Further, the springs that displace the latches from the retracted positions typically need sufficient size to provide the requisite force needed to not only at least assist in displacing the top and bottom latches and the associated latch bolts to the extended position, but to also displace the relatively heavy rods that exert the pulling force on the top and bottom latches. For example, in at least some applications, the springs may need to be of sufficient size to displace rods that are six feet in length from the pull position. Further, besides increasing the complexity and associated costs of the multi-point exit lock device, such linkages, springs, and rods increase the weight of the door, which may in turn increase the difficulty of operation of the exit device and/or the ability to displace the door between the open and closed positions.

Additionally, the physical size of the components of concealed exit devices and/or the size of the space needed to accommodate operation of the concealed components may require the removal or a relatively large portion of the interior core material of the door. Yet, the removal of such core materials, particularly from doors constructed of materials such as wood, may relatively substantially weaken the strength of the door. Prior attempts to address such weakening of doors due to accommodating concealed components of exit devices, particularly for wood doors, has included securing a metal wrap or bracket to the door to at least attempt to strength the weakened areas of the door. Yet, such metal wraps or brackets add an additional component and increase associated costs of the door. Further, such metal wraps or brackets may not be aesthetically pleasing, particularly when applied to ornate wood doors.

BRIEF SUMMARY

An aspect of the present invention is a center slide assembly for use with an exit device to control the displacement of a latch mechanism. The center slide assembly includes a center slide having a sidewall that generally defines an inner region. The center slide assembly also includes one or more spool assemblies that are configured for displacement along at least a portion of the inner region. The one or more spool assemblies may include a latching pin. The center link assembly further includes a tilting link that is positioned adjacent a front portion of the sidewall of the center slide. The tilting link is configured to be pivotally displaced from an unlocked position to a locked position, and to retain the latching pin of at least one of the one or more spool assemblies in a jog of the tilting link when the tilting link is in the locked position.

Another aspect of the present invention is a center slide assembly for use with an exit device to control the displacement of a top latch mechanism and a bottom latch mechanism. The center slide assembly includes a center slide having a sidewall that generally defines an inner region, with the sidewall having a distal end and a proximal end. The center slide assembly also includes an upper spool assembly that is configured for displacement along at least a portion of the inner region from a first position at the distal end of the sidewall to a second position. The upper spool assembly also includes a first latching pin. Further, the center slide assembly includes a lower spool assembly having a second latching pin, the lower spool assembly being configured for displacement along at least a portion of the inner region from a first position at the proximal end of the sidewall to a second position. Additionally, the center slide assembly includes a tilting link that is positioned adjacent a front portion of the sidewall of the center slide, the tilting link being adapted to be pivotally displaced from an unlocked position to a locked position by engagement with the first latching pin as the upper spool assembly is displaced from the first position to the second position. The tilting link is also adapted to retain the second latching pin in a jog of the tilting link when the tilting link is in the locked position and the lower spool assembly is in the second position.

Additionally, an aspect of the present invention includes a center slide assembly for use with an exit device to control the displacement of a top latch mechanism and a bottom latch mechanism. The center slide assembly includes a center slide having a sidewall that generally defines an inner region. The center slide assembly also includes an upper spool assembly that is configured for displacement along at least a portion of the inner region. The upper spool assembly includes a first latching pin, a first adjustment mechanism, and a first spool, the first adjustment mechanism being configured to adjust a position of the first spool. The center slide assembly further includes a lower spool assembly that is configured for displacement along at least a portion of the inner region. The lower spool assembly has a second latching pin, a second adjustment mechanism, and a second spool. The second adjustment mechanism is configured to adjust a position of the second spool. The center slide assembly also includes a tilting link that is adjacent to a front portion of the sidewall of the center slide. The tilting link is adapted to be pivotally displaced from an unlocked position to a locked position by slideable engagement with the first latching pin. The tilting link is also adapted to retain the second latching pin in a jog of the tilting link when the tilting link is in the locked position.

Other aspects of the present invention will become apparent by consideration of the detailed description and accompanying drawings.

BRIEF DESCRIPTION OF THE DRAWINGS

FIG. 1 illustrates a side perspective view of the tilting link operably connected to the center link of the center slide assembly shown in FIG. 3A.

Figure 1:
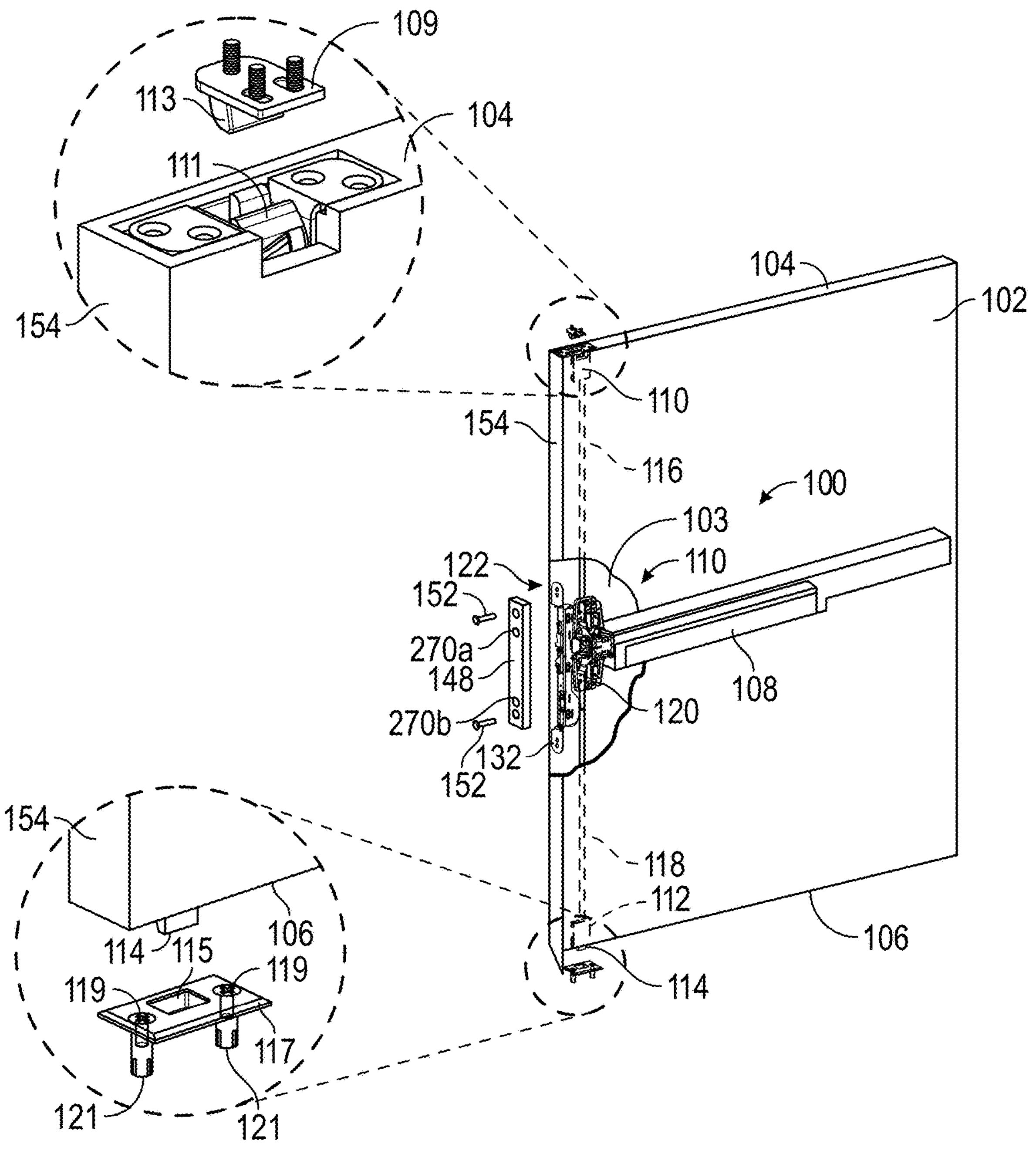
FIG. 1 illustrates a front perspective view of an exit device that is operably connected to a door according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," and "bottom" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof, FIG. 1 illustrates a front perspective view of an exit device 100 that is operably connected to a door 102 according to an embodiment of the present invention. The door 102 may be constructed from a variety of different materials including, for example, wood. The door 102 includes at least two opposing edges such as, for example, a top edge 104 and a bottom edge 106. According to certain embodiments, the exit device 100 may include a push bar 108, a top latch mechanism 110, and a bottom latch mechanism 112. In the illustrated embodiment, the bottom latch mechanism 112 includes a latch bolt 114 that is configured to be displaced between extended and retracted positions. For example, when the door 102 is in a closed position, and with the latch mechanisms 110, 112 in extended positions, a latch bolt 114 of each of the latch mechanisms 110, 112 may extended into a mating recess 115 in an adjacent structure, such as an adjacent recess in a door frame, wall, and/or floor, among other structures. Moreover, in the illustrated embodiment, the mating recess 115 may be positioned within a base plate 117 that may be secured to an adjacent structure such as, for example, secured to a floor or lower portion of a door frame via one or more mechanical fasteners 119 that operably pass through apertures 121 in the base plate 117. Further, in the illustrated embodiment, the top latch mechanism 110 may include a rotatable latch apparatus 111 that is configured to receive removable insertion of a protrusion 113 of a door strike 109. According to such an embodiment, when the door 102 is to be displaced from a closed position, operation of the top latch mechanism 110 may cause the latch apparatus 111 to be pivotally displaced from a first lock position in which the protrusion 113 is secured in a retention area of the latch apparatus 111, to a second unlocked position in which the latch apparatus 111 may be displaced away from the door strike 109 and the associated protrusion 113. However, according to other embodiments, other types of latch mechanisms may be employed for the top and/or bottom latch mechanisms 110, 112. Additionally, the top and bottom latch mechanisms 110, 112 may be the same type of latch mechanisms, or may be different types of latch mechanisms.

Figure 2A:
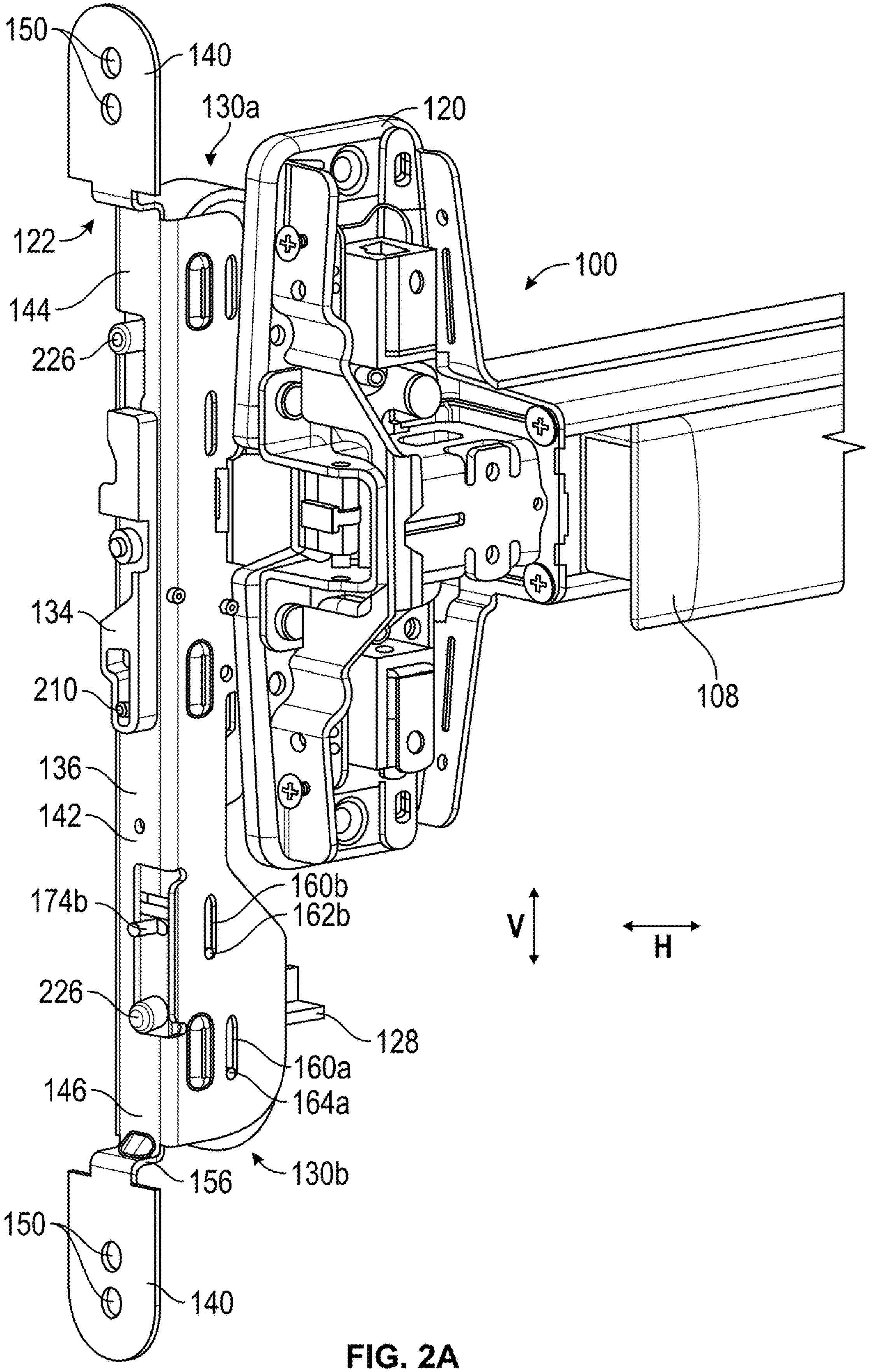
FIG. 2A illustrates a front perspective view of a portion of the exit device illustrated in FIG. 1.

At least portions of the exit device 100 may be positioned within an interior region 103 of the door 102 such as, for example, in one or more cavities or channels in the door 102. For example, referencing FIGS. 1 and 2A, according to the illustrated embodiment, the exit device 100 may further include upper and lower cables 116, 118, a center case 120, and a center slide assembly 122 that may, at least in part, be positioned within the interior region 103 of the door 102. Moreover, according to certain embodiments, the center slide assembly 122 is configured to be positioned in the interior region 103 of doors 102 that are constructed from wood, among other materials. Moreover, the center slide assembly 122 may be sized and configured to generally minimize the space provided by the interior region 103 to accommodate the physical size and operation of the center slide assembly 122. By minimizing the space requirements for the center slide assembly 122, the strength of portions of the door 102 that are positioned adjacent the area of the interior region 103 that houses the center slide assembly 122 may be improved, and may therefore eliminate the need to improve door strength through the use of securing metal wraps or braces to the door 102. Additionally, at least a portion of the top and bottom latch mechanisms 110, 112 may also be positioned within the interior region 103. However, various components of the exit device 100, including a push bar 108, for example, may be positioned at a variety of other locations besides, or in addition to, the interior region 103 including, for example, against or extending from an exterior surface 126 of the door 102, or within other components that are operably secured to the door 102.

Operable displacement of the push bar 108 may provide forces that are translated by the exit device 100 into motion that is used to adjust the top and bottom latch mechanisms 110, 112 from locked positions to unlocked positions such as, for example, pivotally displacing the latch apparatus 111 of the top latch mechanism 110 from the first locked position to the second unlocked position and/or the retracting the latch bolt 114 of the bottom latch mechanism 112 from the mating adjacent recess 115. Such displacement of components of the top and bottom latch mechanisms 110, 112 may allow the door 102 to be displaced from a closed position to an open position, as well as to other positions there between. According to the illustrated embodiment, operation (such as operable depressing) of the push bar 108 may provide a pulling force in a first direction such, as, for example, a pulling force generally in a horizontal direction ("H" direction in FIG. 2A) that is transferred to one or more components of the center case 120. The center case 120 may be configured to translate such a pulling force(s) into motion in at least a second direction such as, for example, motion generally in opposing vertical directions ("V" direction in FIG. 2A). According to the illustrated embodiment, the center case 120 is configured to translate the pulling force(s) from the push bar 108 into motion of one or more extensions or fingers 213*a*, 213*b* that engage a protrusion 128 of one or more spool assemblies 130*a*, 130*b* that are operably connected to the center slide 132, as discussed in further detail below.

FIGS. 3A-5B illustrate a center slide assembly 122 according to an embodiment of the present invention. As shown in the illustrated embodiment, the center slide assembly 122 includes a center slide 132, an upper spool assembly 130*a*, a lower spool assembly 130*b*, and a tilting link 134. According to certain embodiments, the center slide 132 may include a body portion 136 having a sidewall 138 that generally defines an inner region 124, and may further include one or more attachment arms 140. According to the illustrated embodiment, attachment arms 140 may extend from a front portion 142 of both a distal end 144 and a proximal end 146 of the sidewall 138, and may be configured to secure the center slide 132 to an adjacent surface. For example, the attachment arms 140 may be configured to secure the center slide 132 to an inner or outer surface of the door 102 and/or for an operable connection to a face plate 148 that is mounted to the door 102 as shown, for example, in FIG. 1. Moreover, according to certain embodiments, the center slide 132 may be configured to engage the face plate 148 in a manner that allows the center slide 132 to be inserted into the interior region 103 of the door 102 in a manner similar to mortise style locks. According to certain embodiments, the attachment arms 140 may include one or more apertures 150 that are configured to receive a mechanical fastener 152 such as, for example, a screw, pin, or bolt, among other fasteners. The mechanical fasteners 152 may pass through the face plate 148 and/or through a wall or edge 154 of the door 102 and into the apertures 150 of the attachment arms 140. Further, according to certain embodiments, the mechanical fasteners 152 may also pass through a wall or edge 154 of the door 102 that is positioned between the center slide 132 and the face plate 148.

According to certain embodiments, the attachment arms 140 may be offset from the front portion 142 of the body portion 136 of the center slide 132. For example, as shown in at least FIGS. 3A, 3B and 4, the attachment arms 140 may be offset from the body portion 136 of the center slide 132 by extension arms 156. Such offsetting may, at least in part, provide a cavity 158 between the extension arms 156 that is sized, at least in part, to accommodate the pivotal displacement of the tilting link 134, as discussed in further detail below. Moreover, the cavity 158 may be configured to offset the tilting link 134 from an adjacent surface such as, for example, an inner surface of the door 102 or the face plate 148 so that the adjacent surface does not interfere with or otherwise impede the operable displacement of the tilting link 134. Alternatively, rather than offsetting the attachment arms 140, the cavity 158 may be a recess within the front portion 142 of the body portion 136 of the center slide 132 that is configured to provide an area for the pivotal displacement of the tilting link 134.

The inner region 124 of the center slide 132 may be configured to receive the slideable displacement of at least one or more spool assemblies. For example, in the illustrated embodiment, the inner region 124 may be sized for the slideable displacement of the upper and lower spool assemblies 130*a*, 130*b* along at least a portion of the inner region 124. Further, the sidewall 138 of the center slide 132 may include one or more guide apertures 160*a*, 160*b* that are configured to at least assist in retaining an engagement between the center slide 132 and the upper and lower spool assemblies 130*a*, 130*b*, and/or to at least assist guiding the direction of the displacement of the upper and lower spool assemblies 130*a*, 130*b*. For example, in the illustrated embodiment, for each spool assembly 130*a*, 130*b*, opposing first and second sides 162*a*, 162*b* of the sidewall 138 of the center slide 132 may have a first guide aperture 160*a* and a second guide aperture 160*b* that are each configured to receive the slideable insertion of a pin 164*a*, 164*b* of the adjacent spool assembly 130*a*, 130*b*, and which generally assists in guiding the displacement of the spool assemblies 130*a*, 130*b* toward and away from each other. The first and second guide apertures 160*a*, 160*b* may be placed in a variety of different locations in the center slide 132 so as to accommodate the location of the first and second pins 164*a*, 164*b* of the spool assemblies 130*a*, 130*b*. For example, in the illustrated embodiments, the first guide aperture 160*a* may generally extend along a first axis 166*a* that is arranged generally parallel to, and which may be offset from, a second axis 166*b* of the second guide aperture 160*b*.

Figure 7:
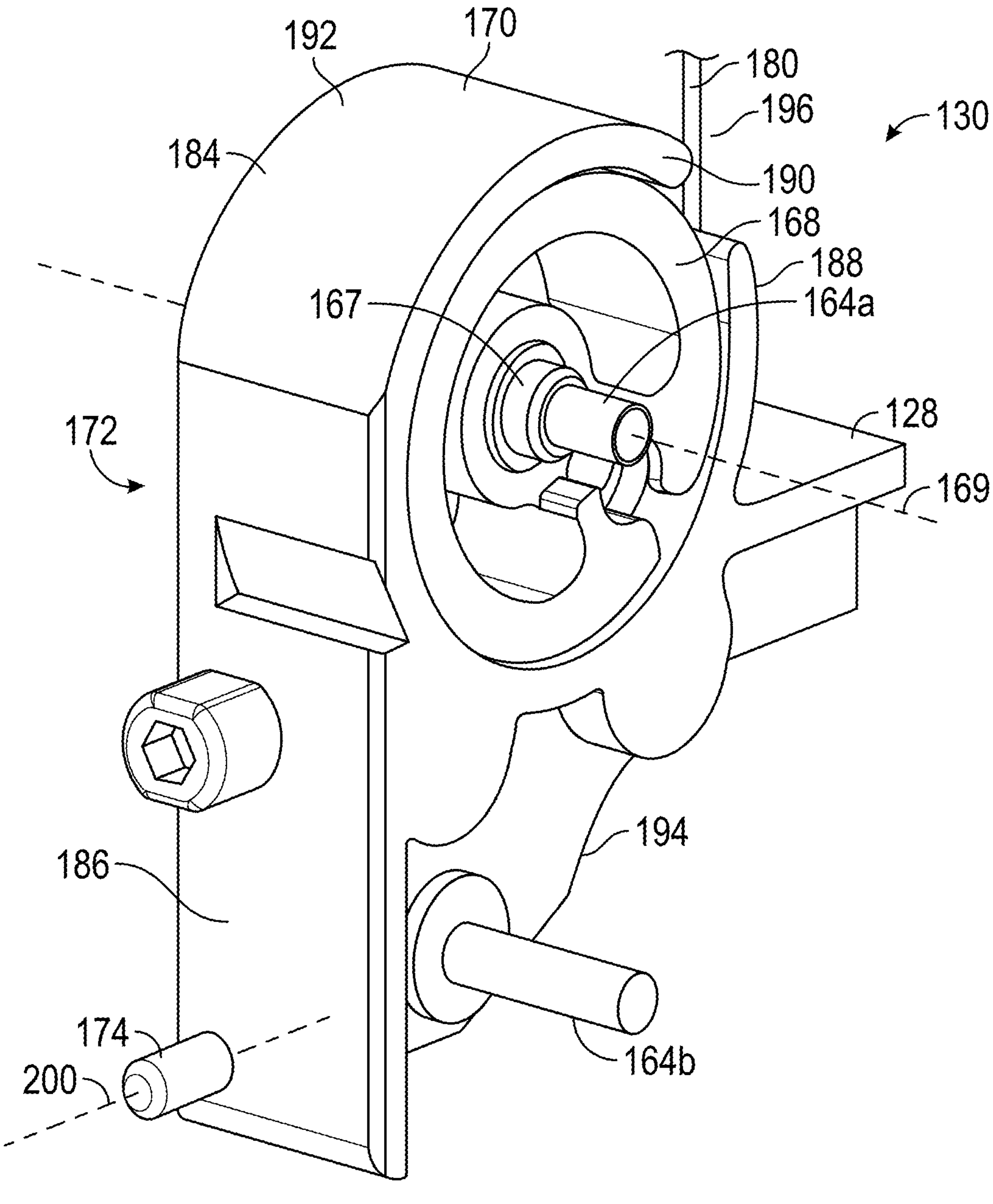
FIG. 7 illustrates a front side perspective view of a spool assembly according to an embodiment of the present invention.
Figure 8:
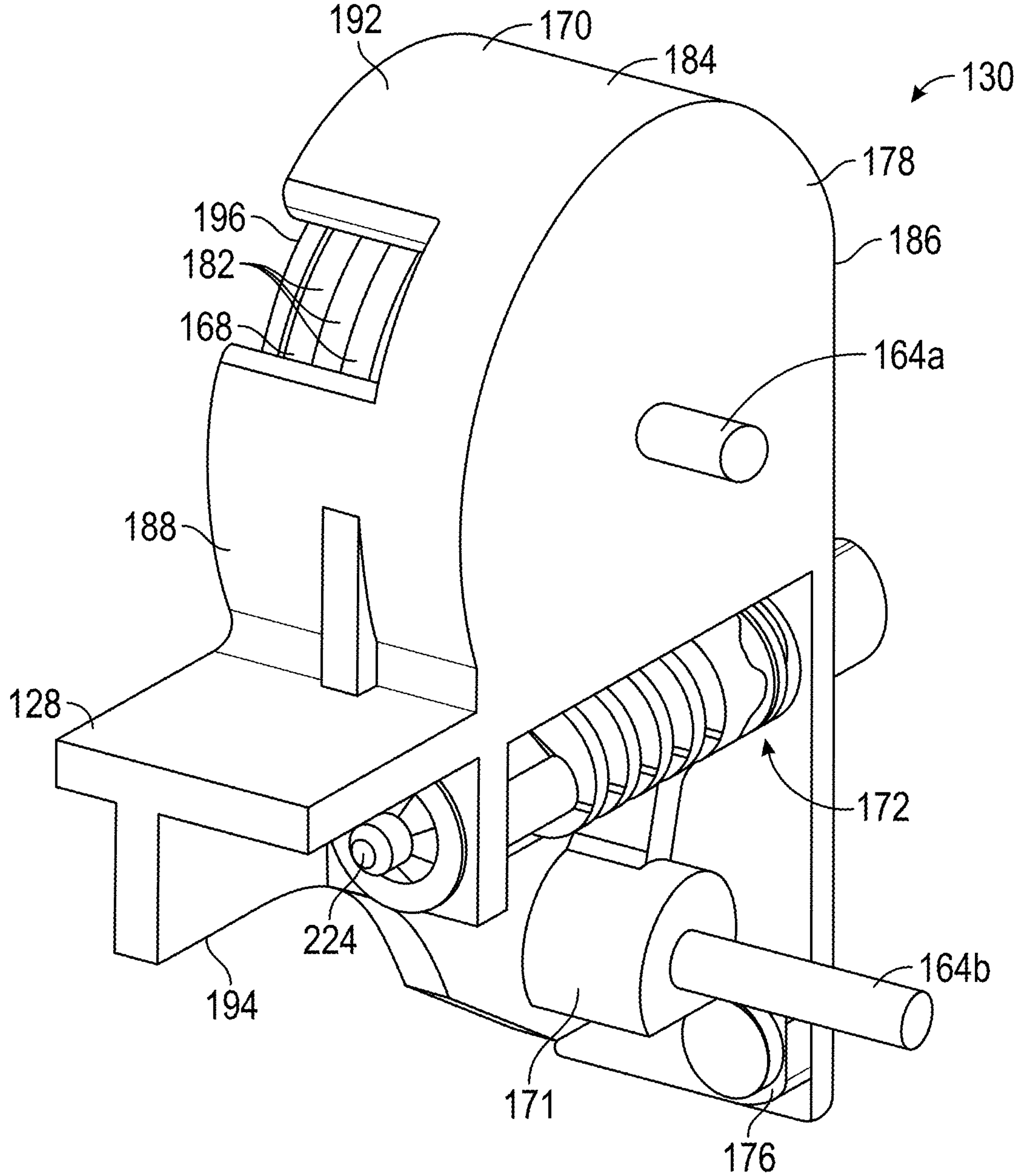
FIG. 8 illustrates a rear side perspective view of the spool assembly shown in FIG. 7.

FIGS. 7 and 8 illustrate front and rear side perspective views of an embodiment of a spool assembly 130 that may be used for the upper and/or lower spool assemblies 130*a*, 130*b*. In the illustrated embodiment, the spool assembly 130 may include a spool 168, a housing 170, an adjustment mechanism 172, the first pin 164*a*, the second pin 164*b* and/or a latching pin 174. The spool 168 is rotatable about a spindle axis 169 of a spindle 167 that is operably secured to at least a first side portion 178 of the housing 170. Further, the spool 168 may be operably connected to a first end of a cable 180 such as, for example, the upper and lower cables 116, 118. Further, the spool 168 may configured such that at least a portion of the cable 180 abuts against and/or wrap around at least a portion of the spool 168. Moreover, as shown in at least FIGS. 7 and 8, the spool 168 may include one or more grooves 182 that are configured to receive the insertion of a portion of the cable 180 such as, for example, a portion of the cable 180 that may be wound around the spool 168. Further, the spool 168 may be configured to accommodate extra lengths of the cable 180, and more specifically to accommodate excess cable 180 by allowing the extra cable 180, including bare cable, to be wound around the spool 168. According to certain embodiments, the spool 168 may be biased by a biasing element such that the spool 168 is able to maintain the cable 180 in a state of tension when the latch mechanisms 110, 112, and thus the cable 180, are in associated extended and retracted positions, as well as other positions there between.

The housing 170 may include an outer wall 184 that extends around at least a portion of the spool 168. For example, according to certain embodiments, the outer wall 184 may have a front portion 186, a rear portion 188, the first side portion 178, a second side portion 190, a top portion 192, and a bottom portion 194. The top portion 192 may include an opening or recess 196 that is configured to accommodate the passage of at least a portion of the cable 180 to/from the spool 168. The rear portion 188 of the housing 170 may further include, or be operably connected to, the protrusion 128 that is engaged by the center case 120 when the spool assembly 130 is displaced during operation of the exit device 100 such as, for example, when the push bar 108 is operably depressed.

A variety of different pins or protrusions may be used for the first, second, and latching pins 164*a*, 164*b*, 174. For example, according to certain embodiments, the first pin 164*a* may constitute a portion of the spindle 167 about which the spool 168 rotates. Additionally, according to certain embodiments, the second pin 164*b* may constitute an extension of the housing 170 or a separate pin that is operably secured to the housing 170 by a fastener 171 such as, for example, secured by a one or more bolts, a molded connection, a press fit, a retaining ring, or a clip, among other fasteners. Additionally, according to certain embodiments, the first and second pins 164*a*, 164*b* may extend f-om opposing first and second side portions 178, 190 of the housing 170 along generally parallel and non-intersecting first and second axes 198*a*, 198*b*, respectively, such that the pins 164*a*, 164*b* extend into adjacent first and second guide apertures 160*a*, 160*b*, respectively, in the opposing portions of the sidewall 138 of the center slide 132. According to certain embodiments, the latching pin 174 may extend away from a front portion 186 of the housing 170. The latching pin 174 may constitute an extension of the housing 170 or nay constitute a separate pin that is operably secured to the housing 170 by a fastener 176 such as, for example, secured by a one or more bolts, a press fit, a molded connection, a retaining ring, or a clip, among other fasteners. Further, according to the illustrated embodiment, the latching pin 174 may extend along a third latching pin axis 200 that is arranged generally perpendicular to, and possibly offset from, the first and second axes 198*a*, 198*b* of the first and second pin 164*a*, 164*b*.

Figure 2B:
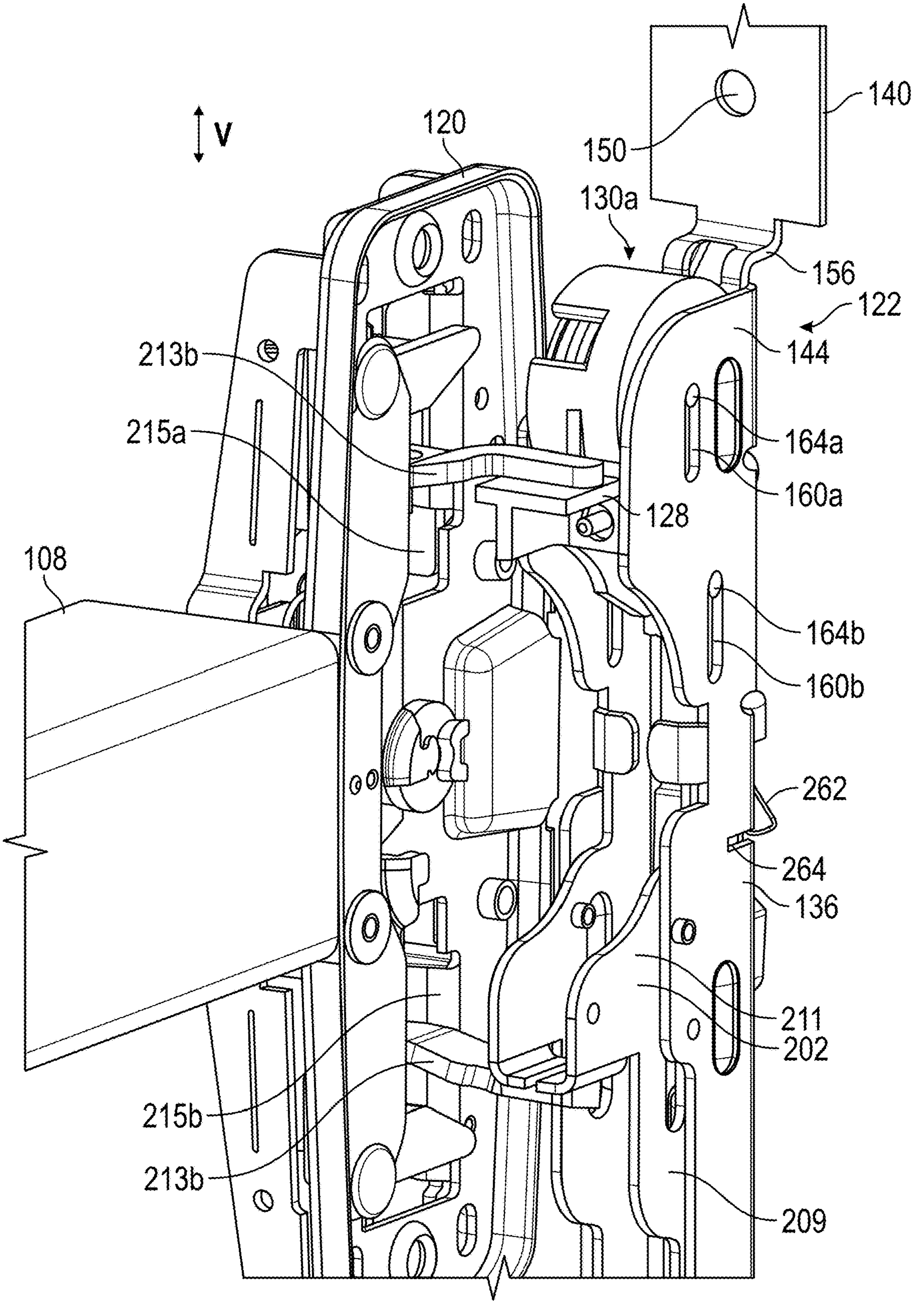
FIG. 2B illustrates a rear perspective view of a portion of the exit device illustrated in FIG. 1.
Figure 3A:
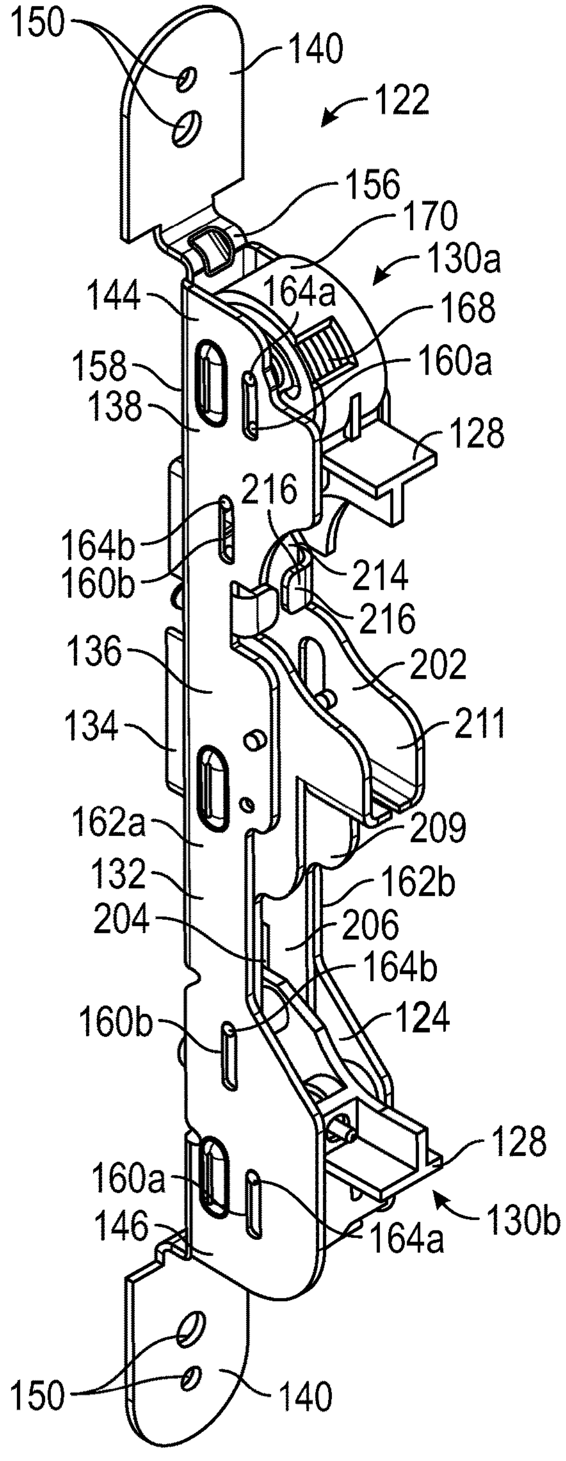
FIGS. 3A and 3B illustrate rear and front perspective views, respectively, of a center slide assembly having a center slide, a tilting link, an upper spool assembly, and a lower spool assembly according to an embodiment of the present invention.
Figure 3B:
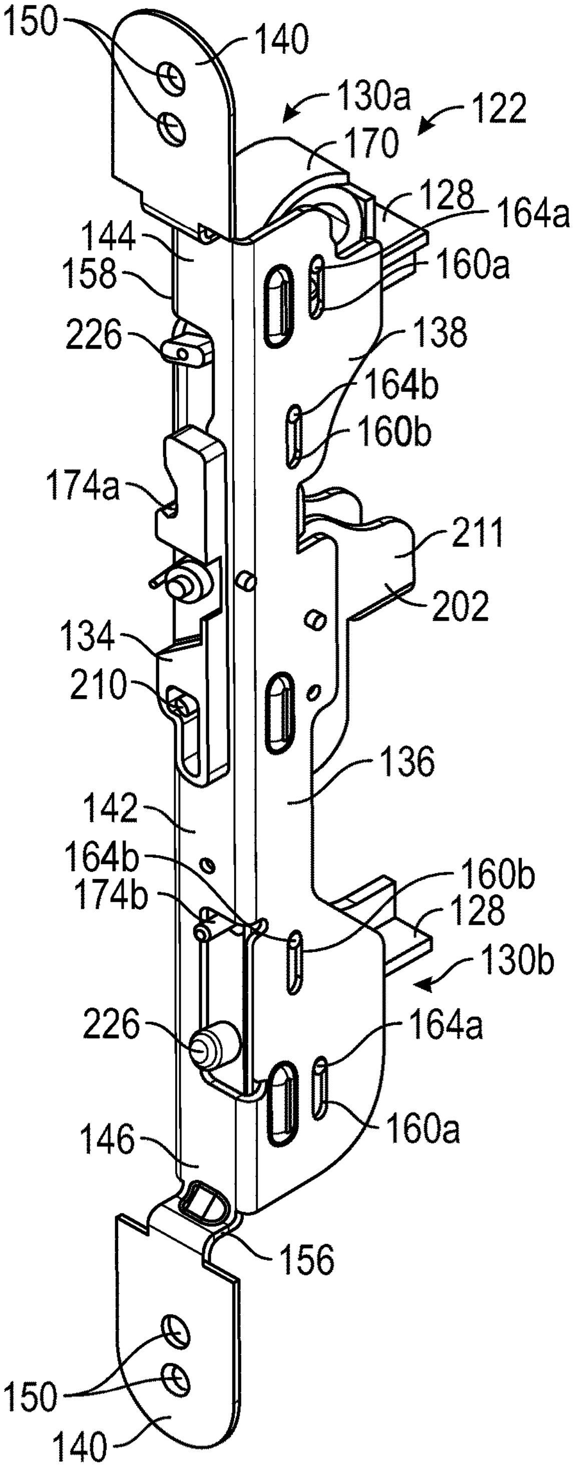
Figure 4:
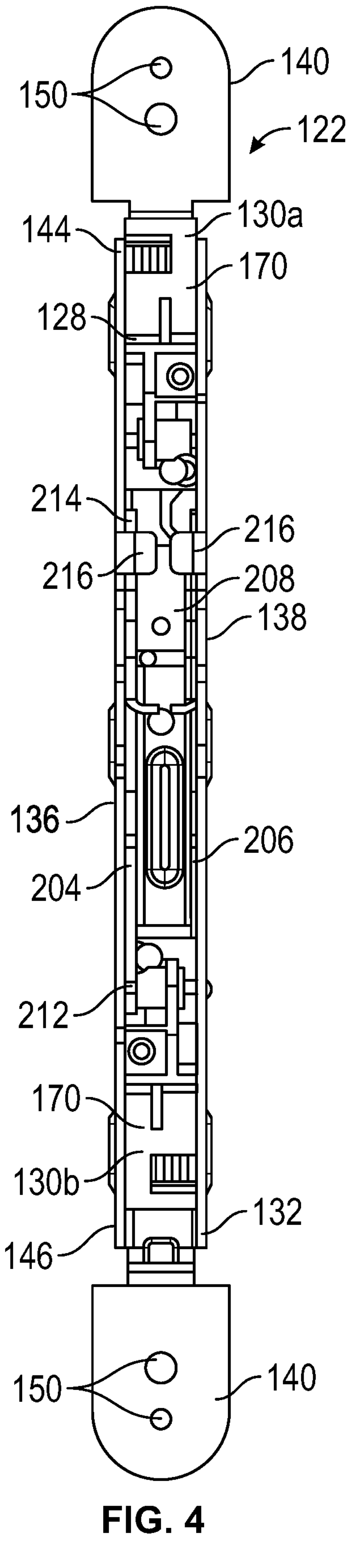
FIG. 4 illustrates a rear view of the center slide assembly shown in FIG. 3A.

As shown in at least FIGS. 3 and 4, according to certain embodiments, the spool assembly 130 may also include an inner slide chassis 202 that is operably connected to the housing 170. The inner slide chassis 202 may be configured to extend the length of the spool assembly 130 so as to prevent components of the spool assembly 130 from being located at a position that may interfere or otherwise impede the operation of the center case 120 or other components of the exit device 100. In the illustrated embodiment, the lower spool assembly 130*b* is connected to an inner slide chassis 202 that includes a first sidewall portion 204, a second sidewall portion 206, a front wall portion 208, and a rear portion. As shown in at least FIGS. 5A, 5B and 6, the front wall portion 208 may include, or be operably connected to, a latching pin 210. A distal end 212 of the first and second sidewalls portion 204, 206 may be positioned in the inner region 124 of the center slide 132 between a portion of the first and second side portions 178, 190 of the housing 170 and the center slide 132. Additionally, the first and second side portions 178, 190 may include apertures configured to permit passage of at least the second pin 164*b* as the second pin 164*b* extends toward, and into the second guide aperture 160*b*. A proximal end 214 of the inner slide chassis 202 may be positioned adjacent to one or more tabs 216 of the center slide 132 that at least assist in retaining the inner slide chassis 202 within the inner region 124 and/or assist in guiding the displacement of the inner slide chassis 202 as the lower spool assembly 130*b* is displaced between the extended and retracted positions, as discussed in further detail below. Additionally, a protrusion 211 may extend from the rear portion 209, the protrusion 211 being configured for engagement by the extensions or fingers 213*a*, 213*b* of the center case 120 as shown, for example, in FIG. 2B.

Figure 9:
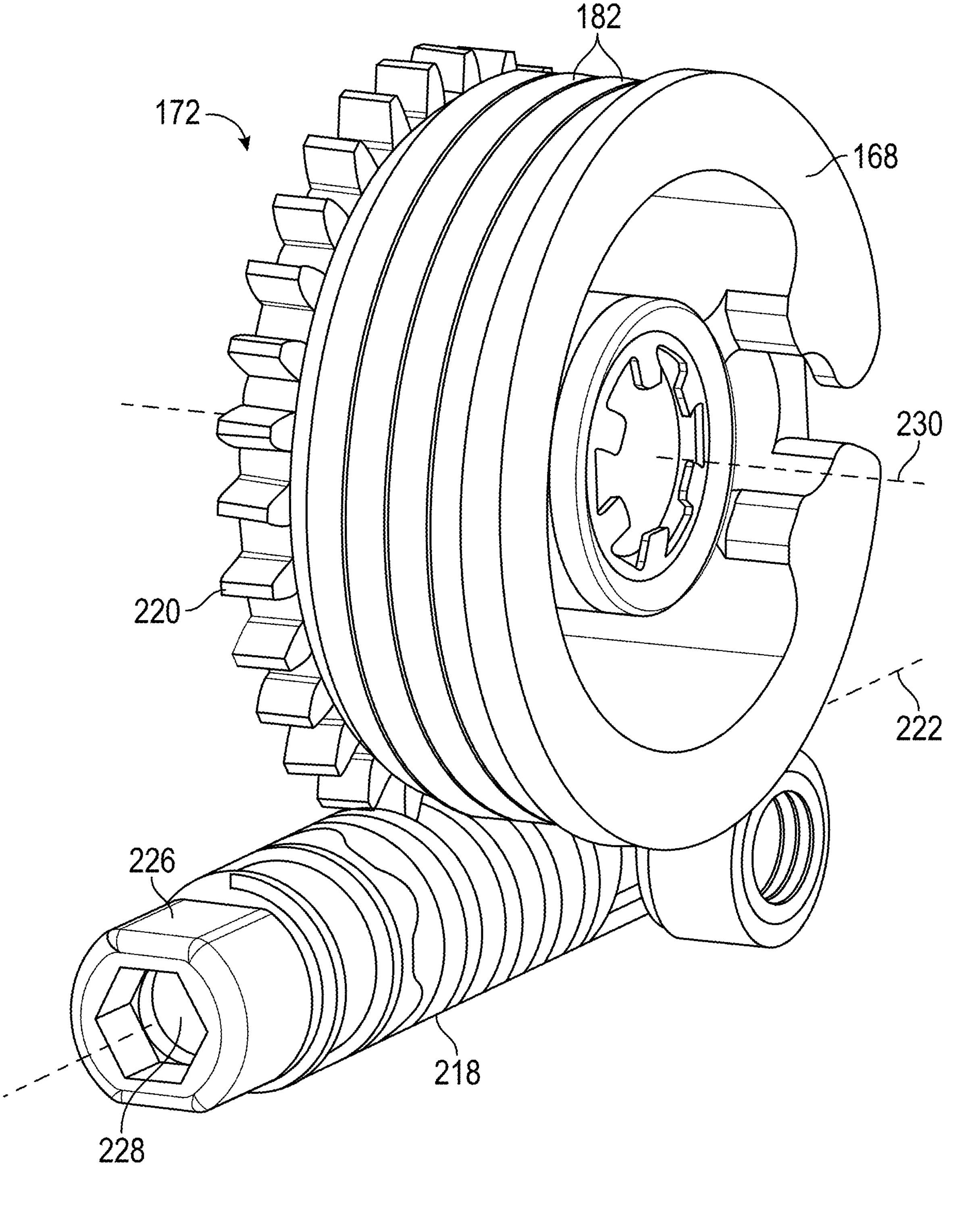
FIG. 9 illustrates a front side perspective view of an adjustment mechanism for a spool assembly according to an embodiment of the present invention.

Referencing FIGS. 7-9, the adjustment mechanism 172 may include a driver component 218 and a driven component 220. The driver component 218 may be configured for rotational displacement about a driver axis 222. Further, the driver component 218 may include, or be operably connected to, a drive shaft 224. The drive shaft 224 may include an engagement end 226 that is configured for operable engagement with a tool such as, for example, a screw driver, hex tool, or socket, among other tools. For example, in the illustrated embodiment, the engagement end 226 includes a recessed portion 228 that is configured for mating engagement with a hex key. According to certain embodiments, the face plate 148 and/or door 102 may include a mating aperture that is generally aligned with, or otherwise opened around, the driver axis 222 such that the tool may operably engage the engagement end 226 of the drive shaft 224 when the center slide assembly 122 is operably installed within the door 102.

The driven component 220 is configured for operable engagement with the spool 168 such that the spool 168 rotates with the rotational displacement of the driven component 220. For example, according to the illustrated embodiment, the spool 168 includes the driven component 220, and/or is operably connected to the driven component 220 such as, for example, by a pin, set screw, key, mechanical fastener, adhesive, or weld, among other engagements. Further, the driven component 220 may be rotated by operation of the driver component 218 about a driven axis 230 that is generally aligned with the spindle axis 169. In the illustrated embodiment, the driver component 218 is a worm screw, and the driven component 220 is a worm gear or wheel. According to such an embodiment, the driver axis 222 is arranged generally perpendicular to and offset from the driven axis 230. Further, the driver component 218 may be rotated in opposite directions so as to rotate the driven component 220, and thus the spool 168, in either a first direction or a second direction so as to increase or decrease the length of cable 180 between the spool 168 and the associated latch mechanism 110, 112, and thereby adjust the tension in the cable 180, as discussed in further detail below.

Figure 10A:
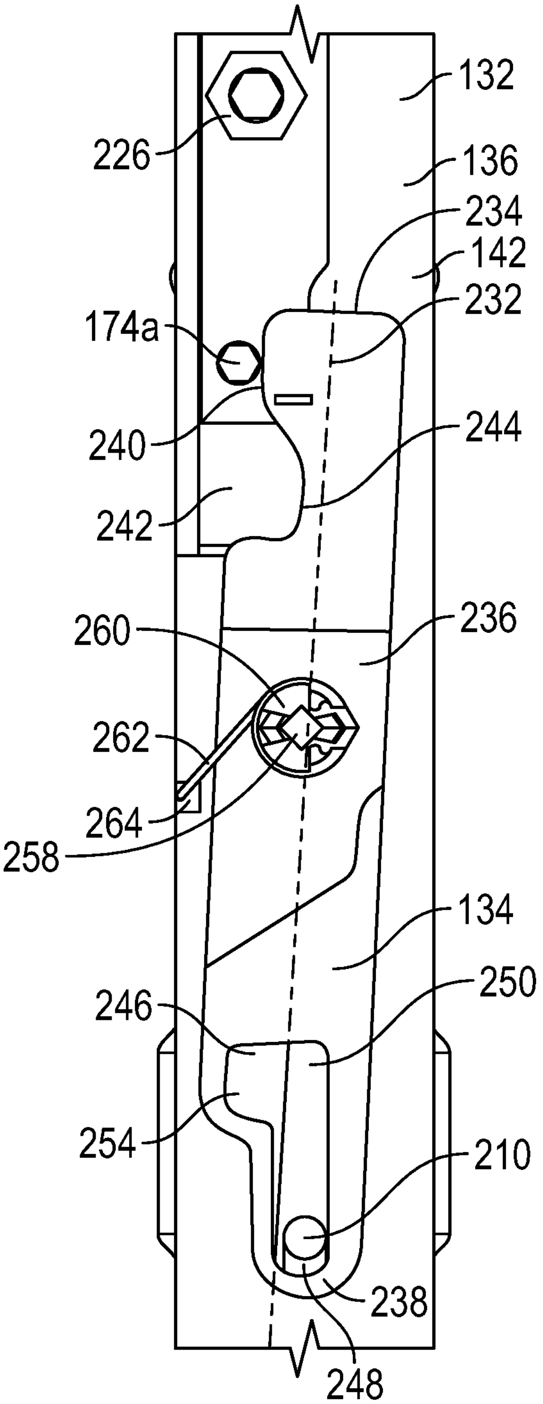
FIGS. 10A and 10B illustrate the tilting link shown in FIG. 3A in an unlocked position and a locked position, respectively.
Figure 10B:
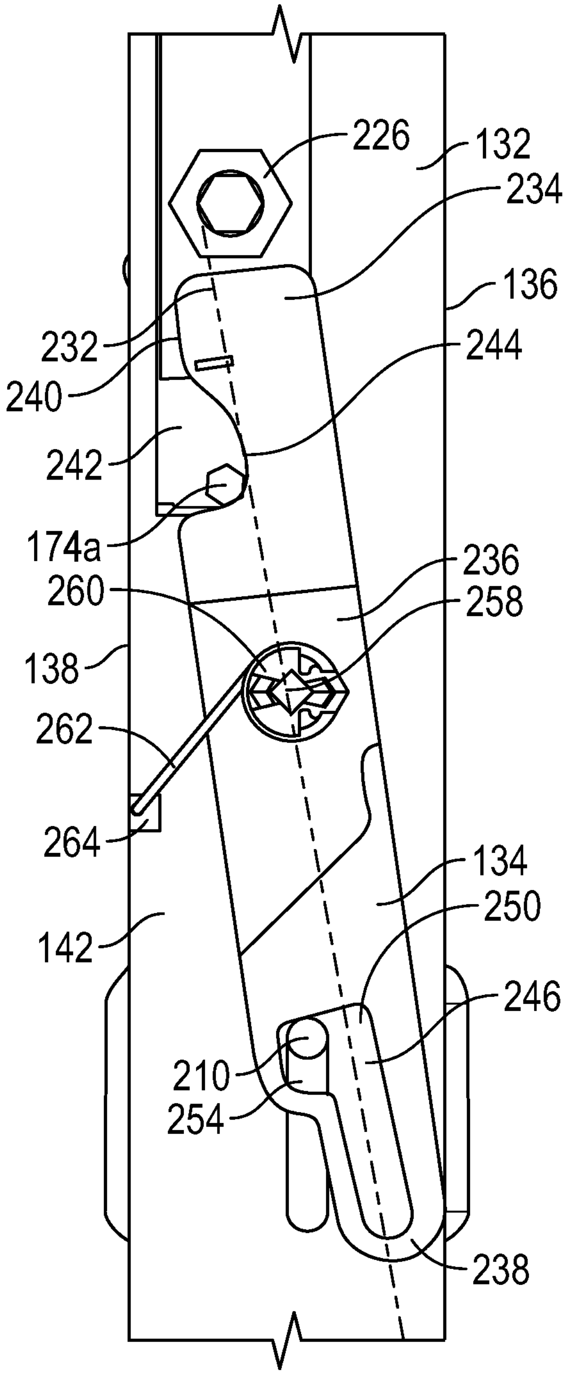
Figure 11:
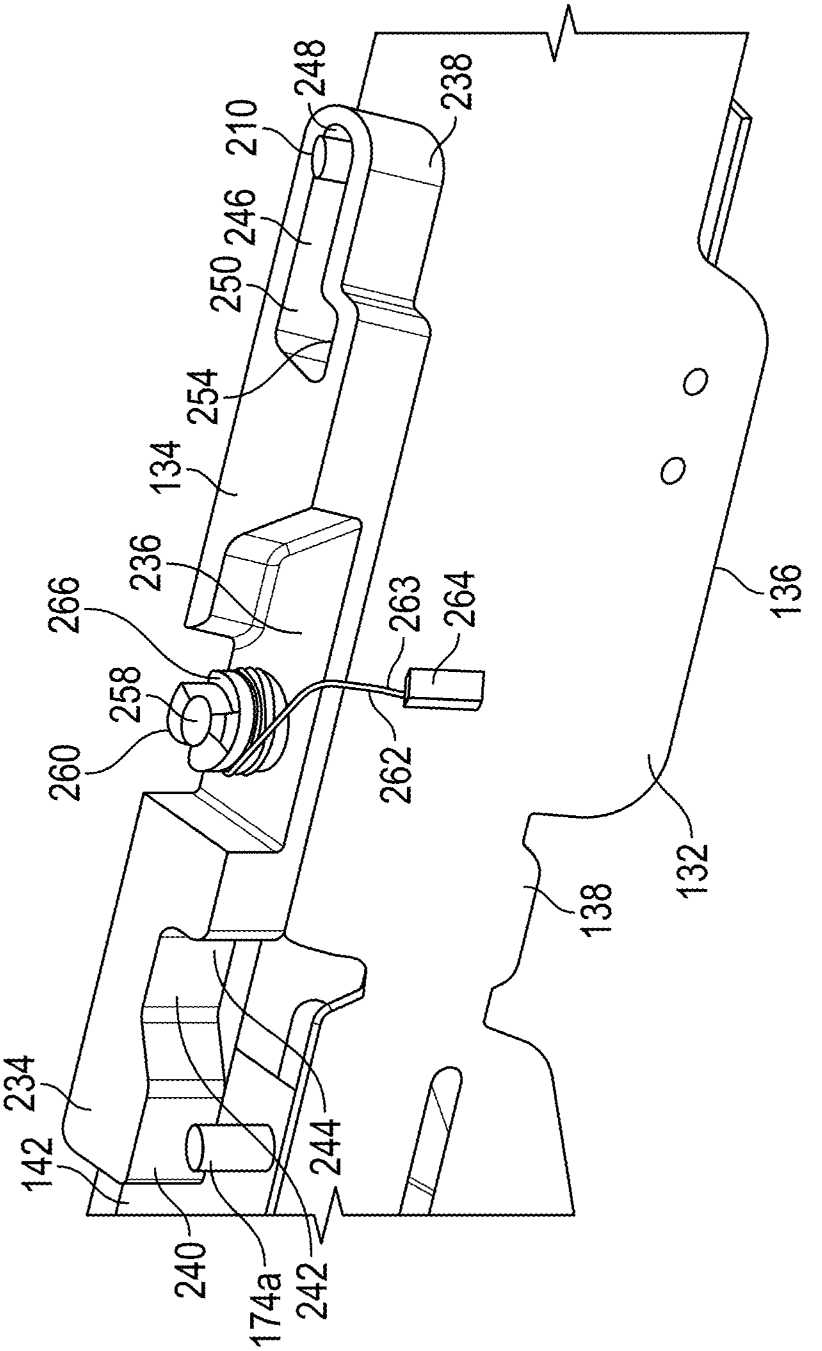
Figure 12:
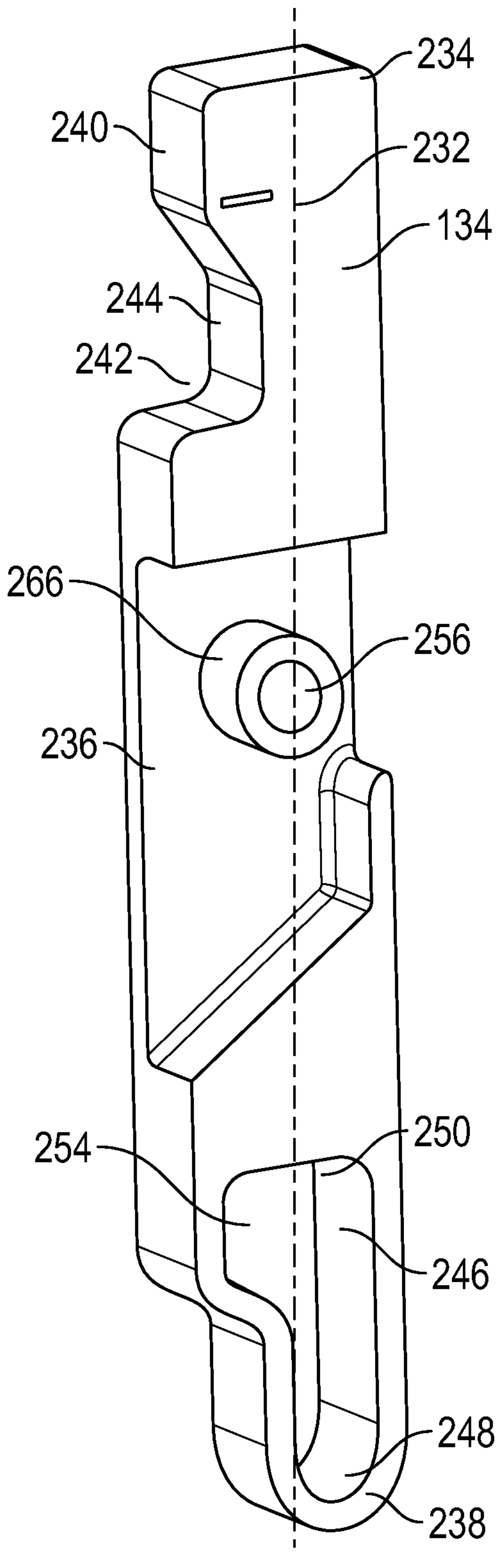
FIG. 12 illustrates a front perspective view of the tilting link shown in FIGS. 3B and 11.

Referencing FIGS. 10-12, the tilting link 134 includes a central longitudinal axis 232, a first end 234, a central portion 236, and a second end 238. In the illustrated embodiment, the tilting link 134 is positioned along the front portion 142 of the center slide 132 so that the first end 234 is positioned relatively adjacent to the latching pin 174*a* of the upper spool assembly 130*a*. According to certain embodiments, the tilting link 134 includes an outer abutment surface 240 positioned a first distance from the central longitudinal axis 232, and an inner recess area 242 having an inner abutment surface 244 positioned a second distance from the central longitudinal axis 232, with the first distance being greater than the second distance. Further, in the illustrated embodiment, the inner recess area 242 and/or the inner abutment surface 244 is/are positioned in closer proximity to the central portion 236 than the outer abutment surface 240. Additionally, at least a portion of the outer abutment surface 240 is configured to engage the latching pin 174*a* of the upper spool assembly 130*a* when the tilting link 134 is in the unlocked position, while at least a portion of the inner recess area 242 is configured to receive, and the inner abutment surface 244 may be configured to engage, the latching pin 174*a* of the upper spool assembly 130*a* when the tilting link 134 is in the locked position.

The second end 238 of the tilting link 134 includes an aperture 246 having a first portion 248 and a second portion 250, the second portion 250 having a jog 254. According to certain embodiments, the aperture 246 is configured to receive the insertion of the latching pin 210 of the lower spool assembly 130*b*. According to other embodiments in which the spool assembly 130 includes an inner slide chassis 202, the aperture 246 is configured to receive the insertion of the latching pin 210 of the inner slide chassis 202. As discussed below, according to the illustrated embodiment, the latching pin 210 may be displaced within the aperture 246 as the spool assembly 130*b* is displaced from an first, extended position, to a second, retracted position, with the latching pin 210 being retained at least in part in the jog 254 when the tilting link 134 is in the locked position.

The central portion 236 of the tilting link 134 includes an orifice 256 that is configured to receive the pivot post 258 that extends from, or through, the front portion 142 of the sidewall 138 of the center slide 132. Further, the tilting link 134 may be secured to the pivot post 258 in a number of different manners including, for example, through the use of a retaining ring or clip 260 that may operably engage the pivot post 258. The tilting link 134 may be configured to be pivotally displaced about the pivot post 258 such as, for example, pivotally displaced between an unlocked position, as shown in FIG. 10A, and a locked position, as shown in FIG. 10B.

Additionally, the tilting link 134 may be biased toward the locked position, as shown in FIG. 10B, by a biasing element 262, such as, for example, by a spring. According to certain embodiments, the biasing element 262 may include a first end 263 that is operably connected to the center slide 132, such as, for example, by being retained in a recess 264 of the center slide 132 (FIG. 11). The biasing element 262 also may include a second end that operably engages the tilting link 134, such as, for example, engages a hub portion 266 of the tilting link 134 so as to exert a force on the tilting link 134 that biases the tilting link 134 to, or toward, the locked position.

During use, the center slide assembly 122 may be secured to the door 102 and/or the face plate 148 as previously discussed, as well as operably connected to the center case 120. Further, first ends of the upper and lower cables 116, 118 may be operably connected to the spools 168 of the associated upper and lower spool assemblies 130*a*, 130*b*. Additionally, a second end of the upper and lower cables 116, 118 may be operably connected to an associated top or bottom latch mechanism 110, 112. In the illustrated embodiment, the upper and lower cables 116, 118 may be configured to exert a pulling force on the associated top and bottom latch mechanisms 110, 112 that retracts the latch bolt 114 of the bottom latch mechanism 112 from the extended position to the retracted position and pivotally displaces the latch apparatus 111 of the top latch mechanism 110 from the first locked position to the second unlocked position. The upper and lower cables 116, 118 may be constructed from a variety of different materials including, for example, steel. Additionally, the cables 116, 118 may provide a degree of elasticity greater than that typically attained by steel pull rods.

Figure 5A:
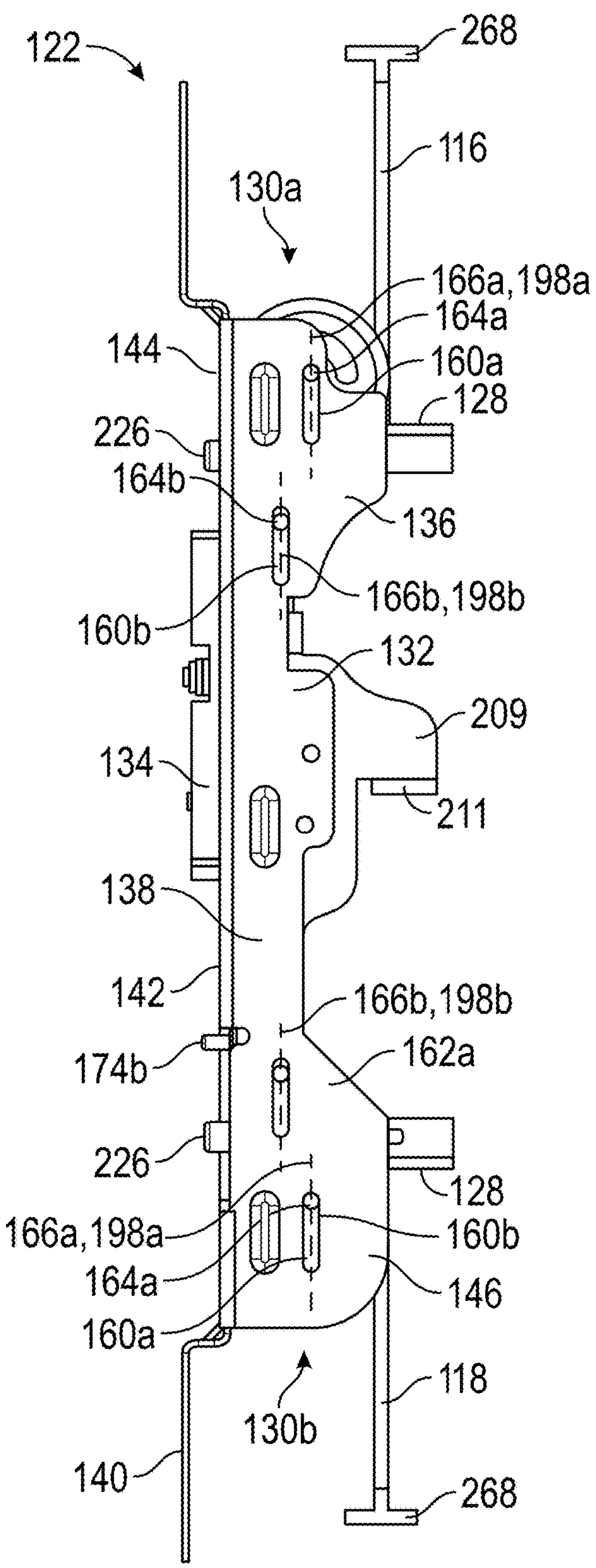
FIGS. 5A and 5B illustrate first and second side views, respectively, of the center slide assembly shown in FIG. 3A, with the upper and lower spools operably attached to upper and lower pull cables, respectively.
Figure 5B:
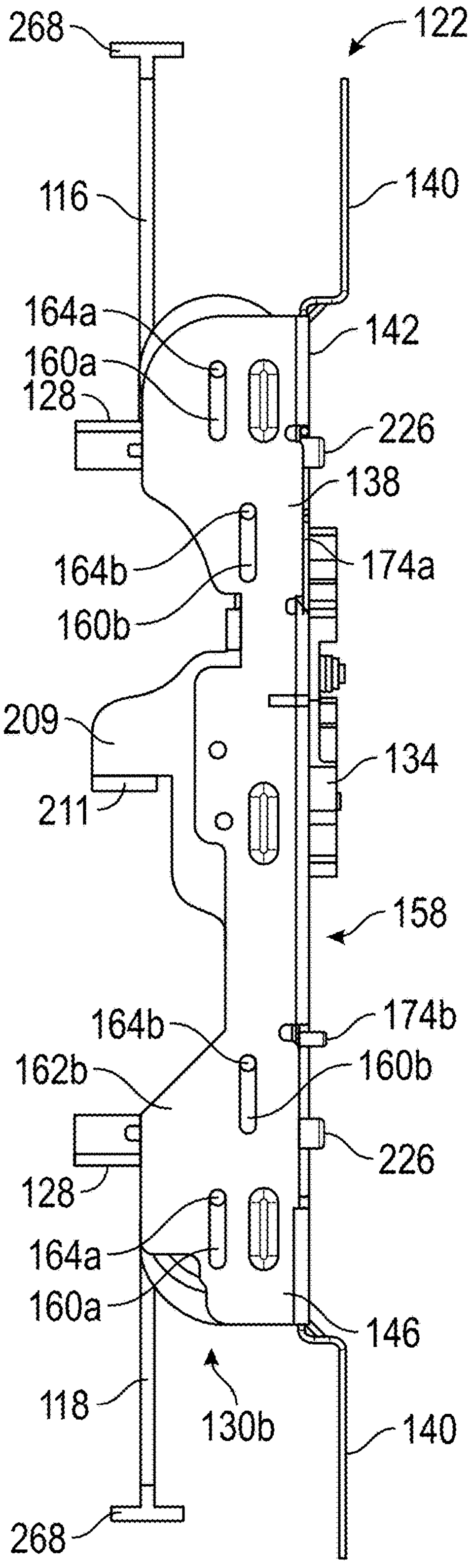
Figure 6:
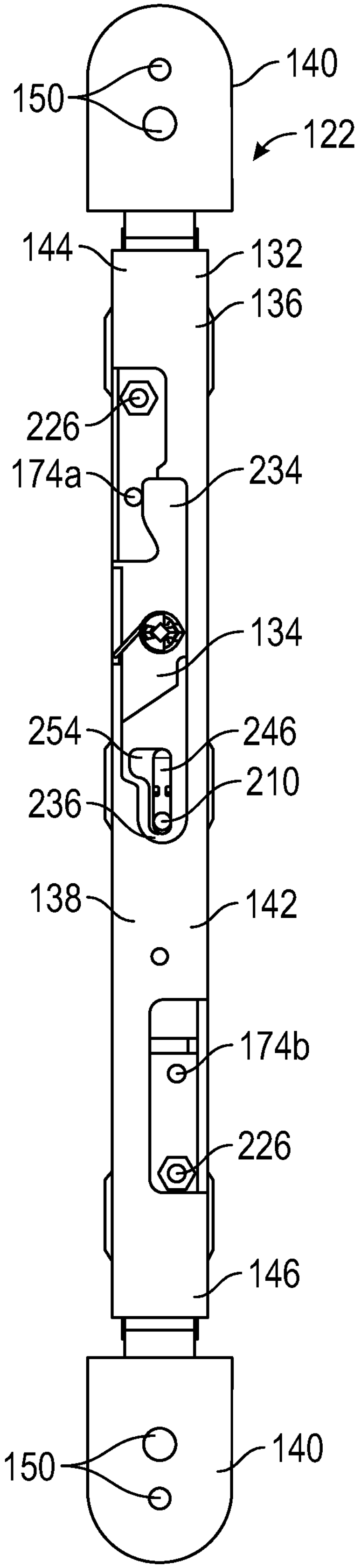
FIG. 6 illustrates a front view of the center slide assembly shown in FIG. 3A.

Referencing FIGS. 5A and 5B, according to certain embodiments, the second end 238 of the upper and lower cables 116, 118 may include, or be operably connected to, an attachment member 268 that engages the associated top or bottom latch mechanism 110, 112. For example, according to certain embodiments, the attachment member 268 of the lower cable 118 may engage a pivotal cable link that is configured to pivotally displace a deadlock latch mechanism from a position that prevents, or otherwise impedes, the ability of the latch bolt 114 to be linearly displaced from the extended position to the retracted position. Additionally, according to certain embodiments, the upper cable 116 may be configured to linearly displace a cable link that allows for, either directly or indirectly, the pivotal displacement of the link apparatus 111. Further, according to other embodiments, the upper or lower cable 116, 118 may provide a pulling force that disengages one or more protrusions from a side surface of the latch bolt 114 so that the protrusions do not interfere with the linear displacement of the latch bolt 114, and thereby allow the latch bolt 114 to be displaced to the retracted position.

With the center slide assembly 122 operably secured to the door 102, and the upper and lower cables 116, 118 operably connected to the associated spools 168 and latch mechanisms 110, 112, the tension in the upper and lower cables 116, 118 may each be adjusted through operation of the associated adjustment mechanism 172. As previously discussed, according to certain embodiments, the face plate 148 and/or door 102 may include an adjustment aperture 270*a* that is generally aligned with the engagement end 226 associated with drive shaft 224 for the adjustment mechanism 172 of the upper spool assembly 130*a* and an adjustment aperture 270*b* that is generally aligned with the engagement end 226 associated with drive shaft 224 for the adjustment mechanism 172 of the lower spool assembly 130*b*. In the illustrated embodiment, the tool may be manipulated so as to rotatably displace the drive shaft 224, thereby rotatably displacing the driver component 218. As previously discussed, the driver component 218 and the driven component 220 are engaged in a manner in which rotation of the driven component 220 is translated into rotational displacement of the driven component, thereby rotating the spool 168.

The spool 168 may be rotated so as to increase or decrease the tension of the attached upper or lower cable 116, 118. For example, rotation of the spool 168 in a first direction may increase the amount of cable 116, 118 that is wound around the spool 168, or otherwise decrease the length of the cable 116 that extends between the spool 168 and the latch mechanism 110, 112, and thereby increase the tension on or tautness of the cable 116, 118. Conversely, rotation of the spool 168 in a second direction may reduce the amount of cable 116, 118 that is wound around the spool 168, or otherwise increase the length of the cable 116, 118 that extends between the spool 168 and the latch mechanism 110, 112, and thereby decrease the tension on or tautness of the cable 116, 118. By adjusting the tension on or tautness of the cable 116, 118, the cable 116, 118 may be adjusted so as to provide sufficient force, when the exit device 100 is operated, to operate the latch mechanisms 110, 112 such as, for example, to pivotally displace the latch apparatus 111 or cause the linear displacement of the latch bolt 114 from the extended position to the retracted position. Such a configuration of the center slide assembly 122 may allow for the adjustment of the tension in the upper cable 116 and/or the lower cable 118.

When the latch mechanisms 110, 112 are in the extended positions, the spool assemblies 130*a*, 130*b* may both be in a first, extended position along the center slide 132. According to certain embodiments, during operation of the exit device 100, displacement of the push bar 108 may be translated into forces that result in more extensions or fingers 213*a*, 213*b* of the center case 120 engaging the protrusions 128 of the upper and lower spool assemblies 130*a*, 130*b*. According to the illustrated embodiment in which the lower spool assembly 130*b* includes an inner slide chassis 202, rather than exert the force on the protrusion 128 of the lower spool assembly 130*b*, the center case 120, and particularly a finger 213*b* of the center case 120, may engage forces against the protrusion 211 of the inner slide chassis 202, as shown, for example, in FIG. 2B. Moreover, depression of the push bar 108 may be translated, by the center case 120 that displaces the fingers 213*a*, 213*b* in opposing second directions, such as, for example, vertical motion ("V" direction in FIG. 2B) in which the fingers 213*a*, 213*b* are moved into closer proximity to each other. Such motion may displace the fingers 213*a*, 213*b* with slots 215*a*, 215*b* in the center case 120.

Displacement of the fingers 213*a*, 213*b* may move the spool assemblies 130*a*, 130*b* along the center slide 132 from the first position to a second retracted position, the spool assemblies 130*a*, 130*b* being in closer proximity to each other when both are in the second position than when both are in the first position. As the upper and lower spool assemblies 130*a*, 130*b* are displaced toward the second positions, the associated first and second pins 164*a*, 164*b* slide or are otherwise displaced within the first and second guide apertures 160*a*, 160*b*. Further, displacement of the upper spool assembly 130*a* along the center slide 132 toward the second position may displace the upper cable 116 so that the upper cable 116 provides a pulling force that alters the position of the top latch mechanism 110 from the first locked position to the second unlocked position. Similarly, displacement of the lower spool assembly 130*b* along the center slide 132 to the second position may displace the lower cable 118 so that the lower cable 118 provides a pulling force that is used to displace, or otherwise allow the displacement of, the latch bolt 114 of the bottom latch mechanism 112 from the extended position to the retracted position.

Additionally, as the upper spool assembly 130*a* is displaced toward the second position, the latching pin 174*a* of the upper spool assembly 130*a* is displaced along the first end 234 of the tilting link 134 and toward the central portion 236 of the tilting link 134. More specifically, the latching pin 174*a* of the upper spool assembly 130*a* moves along the outer abutment surface 240 to a position within the inner recess area 242, which may include an engagement with the inner abutment surface 244. Similarly, in the illustrated embodiment, as the lower spool assembly 130*b* is displaced toward the second position, the latching pin 210 of the inner slide chassis 202 is displaced from the first portion 248 of the aperture 246 of the tilting link 134 to the second portion 250 of the aperture 246. Further, the inner recess area 242 of the tilting link 134 and the second portion 250 of the aperture 246, and more specifically the jog 254 of the aperture 246, are positioned such that as the latching pin 174*a* of the upper spool assembly 130*a* is received in the inner recess area 242, or otherwise engages the inner abutment surface 244, the latching pin 210 of the inner slide chassis 202 is positioned within the aperture 246 so as to not interfere with the ability of the biasing element 262 to pivotally displace the tilting link 134 to the locked position. Moreover, as the top and bottom latch mechanisms 110, 112 reach their retracted or unlocked conditions, and the latching pin 174*a* of the upper spool assembly 130*a* is received within the inner recess area 242 and/or engages the inner abutment surface 244, the tilting link 134 may be pivotally displaced by the biasing element 262 to the locked position so that the latching pin 210 of the inner slide chassis 202 is received within the jog 254 of the second portion 250 of the aperture 246. With the latching pin 210 of the inner slide chassis 202 positioned within the jog 254, and the tilting link 134 biased in the locked position, the latch bolt 114 of the bottom latch mechanism 112 may be retained in the retracted position.

With the tilting link 134 in the locked position and the top and bottom latch mechanisms 110, 112 in their retracted or unlocked condition, the latch apparatus 111 of the top latch mechanism 110 may be triggered from the second unlocked position to the first locked position by the closing of the door 102. For example, the displacement of the door 102 back to the closed position may result in the release of a trigger mechanism that activates a spring that releases the top latch mechanism 110 and/or the associated latch apparatus 111 back to the first locked position so that the latch apparatus 111 operably secures the protrusion 113 of the door strike 109 within a retention area of the latch apparatus 111. The displacement of the top latch mechanism 110 and/or the latch apparatus 111 back to the first locked position may exert a force on the upper cable 116 that pulls the upper spool assembly 130*a* from the second retracted position and toward the distal end 144 of the sidewall 138 of the center slide 132 as the upper spool assembly 130*a* is displaced to the first position. As the upper spool assembly 130*a* is pulled in the general direction of the distal end 144 of the sidewall 138, the latching pin 174*a* of the upper spool assembly 130*a* may be released from the inner recess area 242 such that the retaining pin engages the outer abutment surface 240. Further, the latching pin 174*a* of the upper spool assembly 130*a* may exert sufficient force against the outer abutment surface 240 to overcome the biasing force of the biasing element 262, and thereby pivotally displace the tilting link 134 about the pivot post 258 from the locked position to the unlocked position. With the tilting link 134 pivoted to the unlocked position, the latching pin 210 of the inner slide chassis 202 may be released from the jog 254 so that the latching pin 210 may be able to travel toward the first portion 248 of the aperture 246. With the jog 254 displaced so as to not interfere with the ability of latching pin 210 to travel toward the first portion 248 of the aperture 246, a spring and/or gravity may then provide a force sufficient to displace the bottom latch mechanism 112 and/or the associated latch bolt 114 from the retracted position to the extended position. The displacement of the bottom latch mechanism 112 and/or the associated latch bolt 114 back to the extended position may exert a force on the lower cable 118 that pulls the lower spool assembly **130*b* from the retracted position and toward the proximal end 146 of the sidewall 138 of the center slide 132, and the latching pin 210 may be displaced to the first portion 248 of the aperture 246**.

While the foregoing example was discussed in terms of a lower spool assembly **130*b* having an inner slide chassis 202 that has a latching pin 210 positioned within the aperture 246 of the tilting link 134, according to other embodiments, the center slide assembly 122 may be configured such that a latching pin 174*b* of the lower spool assembly 130*b* is positioned within the aperture 246. Additionally, according to certain embodiments, in addition to, or in lieu of the lower spool assembly 130*b* having an inner slide chassis 202, the upper spool assembly 130*a* may be operably connected to an inner slide chassis 202 that has a latching pin 210 that engages the outer abutment surface 240, and which may be received in the inner recess area 242 and/or engage the inner abutment surface 244**.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system, comprising:

a first spool assembly adapted to be coupled to a first latch device such that actuation of the first spool assembly causes a corresponding actuation of the first latch device, the first spool assembly having a first actuated state and a first deactuated state;

a second spool assembly adapted to be coupled to a second latch device such that actuation of the second spool assembly causes a corresponding actuation of the second latch device, the second spool assembly having a second actuated state and a second deactuated state; and a link engaged with the first spool assembly and the second spool assembly, the link having a holding position and a releasing position;

wherein when the link is in the holding position, the link retains the second spool assembly in the second actuated state;

wherein when the link is in the releasing position, the link permits the second spool assembly to transition from the second actuated state to the second deactuated state; and wherein the first spool assembly is configured to transition the link from the holding position to the releasing position as the first spool assembly transitions from the first actuated state to the first deactuated state.

2. The system of claim 1, wherein the link is configured to pivot between the holding position and the releasing position.

3. The system of claim 1, wherein transition of the second spool assembly to the second deactuated state does not occur before transition of the first spool assembly to the first deactuated state.

4. The system of claim 1, further comprising a spring urging the link toward the holding position; and wherein the link is configured to transition from the holding position to the releasing position against the force of the spring in response to transitioning of the first spool assembly from the first actuated state to the first deactuated state.

5. The system of claim 1, wherein the first spool assembly is engaged with the link via a first interface, the first interface comprising a ramp and a first pin configured to engage the ramp and urge the link toward the releasing position during transitioning of the first spool assembly toward the first deactuated state.

6. The system of claim 5, wherein the second spool assembly is engaged with the link via a second interface, the second interface comprising a second pin and a jog, the jog configured to engage the second pin to retain the second spool assembly in the second deactuated state while the link is in the holding position.

7. The system of claim 1, further comprising a center slide; and wherein the first spool assembly and the second spool assembly are each configured for displacement along at least a portion of the center slide.

8. The system of claim 1 in combination with an exit device, comprising the first latch device and the second latch device;

wherein a first cable wound on the first spool assembly extends to the first latch device; and wherein a second cable wound on the second spool assembly extends to the second latch device.

9. The system in combination with the exit device of claim 8, wherein the first spool assembly further comprises a first adjustment mechanism operable to adjust a first effective length of the first cable; and wherein the second spool assembly further comprises a second adjustment mechanism operable to adjust a second effective length of the second cable.

10. A system, comprising:

a first spool assembly adapted to be coupled to a first latch device such that actuation of the first spool assembly causes a corresponding actuation of the first latch device, the first spool assembly having a first actuated state and a first deactuated state;

a second spool assembly adapted to be coupled to a second latch device such that actuation of the second spool assembly causes a corresponding actuation of the second latch device, the second spool assembly having a second actuated state and a second deactuated state; and a link engaged with the first spool assembly and the second spool assembly, the link having a holding position and a releasing position; and wherein when the first spool assembly is in the first actuated state and the link is in the holding position, the link retains the second spool assembly in the second actuated state.

11. The system of claim 10, wherein the link is configured to pivot between the holding position and the releasing position.

12. A system, comprising:

a first spool assembly adapted to be coupled to a first latch device such that actuation of the first spool assembly causes a corresponding actuation of the first latch device, the first spool assembly having a first actuated state and a first deactuated state;

a second spool assembly adapted to be coupled to a second latch device such that actuation of the second spool assembly causes a corresponding actuation of the second latch device, the second spool assembly having a second actuated state and a second deactuated state; and a link engaged with the first spool assembly and the second spool assembly, the link having a holding position and a releasing position; and wherein when the first spool assembly is transitioned from the first actuated state to the first deactuated state, the link is correspondingly transitioned from the holding position to the releasing position to permit the second spool assembly to transition from the second actuated state to the second deactuated state.

13. The system of claim 12, wherein when the first spool assembly transitions from the first actuated state to the first deactuated state, the first spool assembly engages the link and drives the link from the holding position to the releasing position.

14. The system of claim 12, further comprising a spring urging the link toward the holding position.

* * * * *